United States Patent Office 3,328,111
Patented June 27, 1967

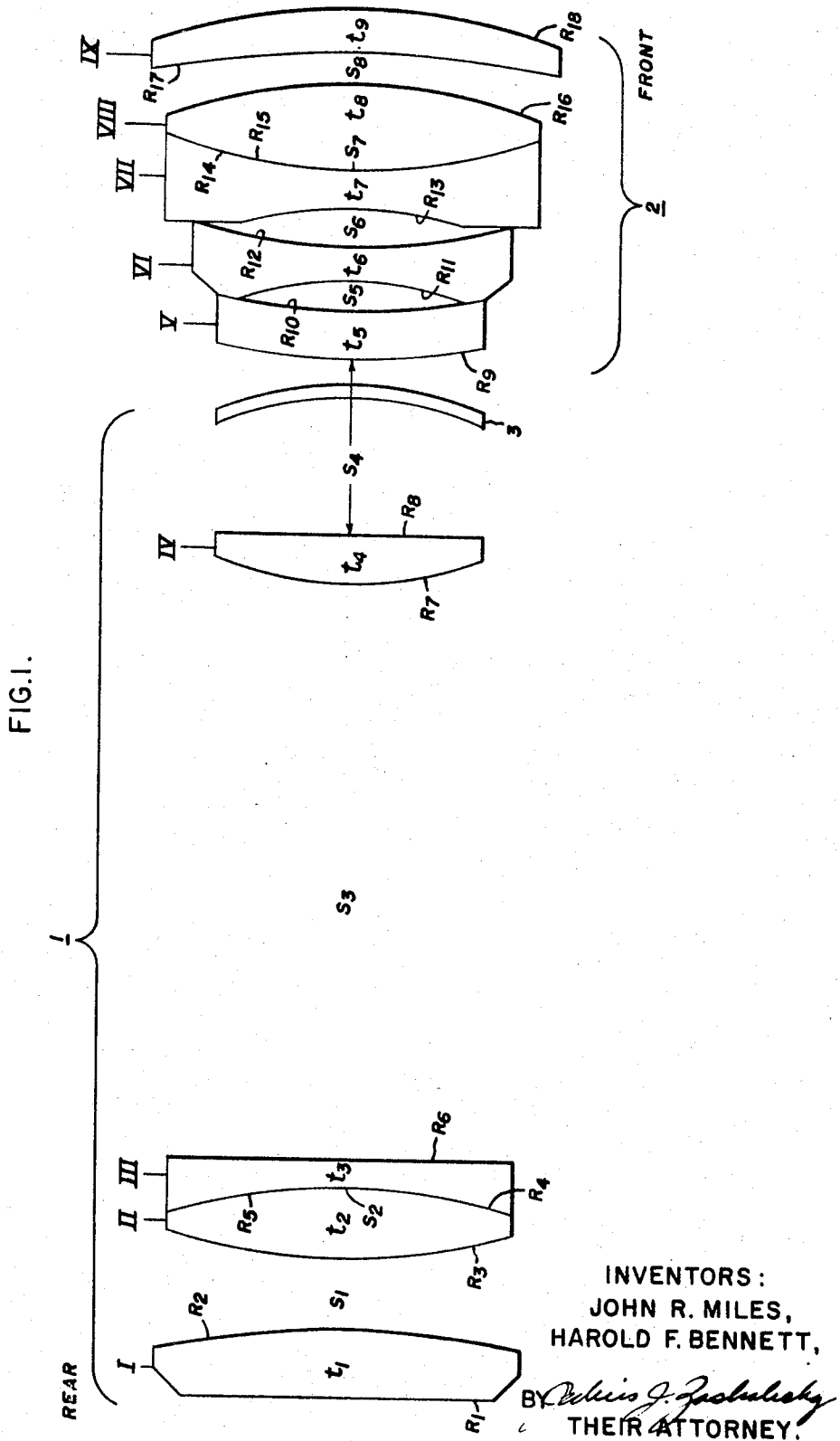

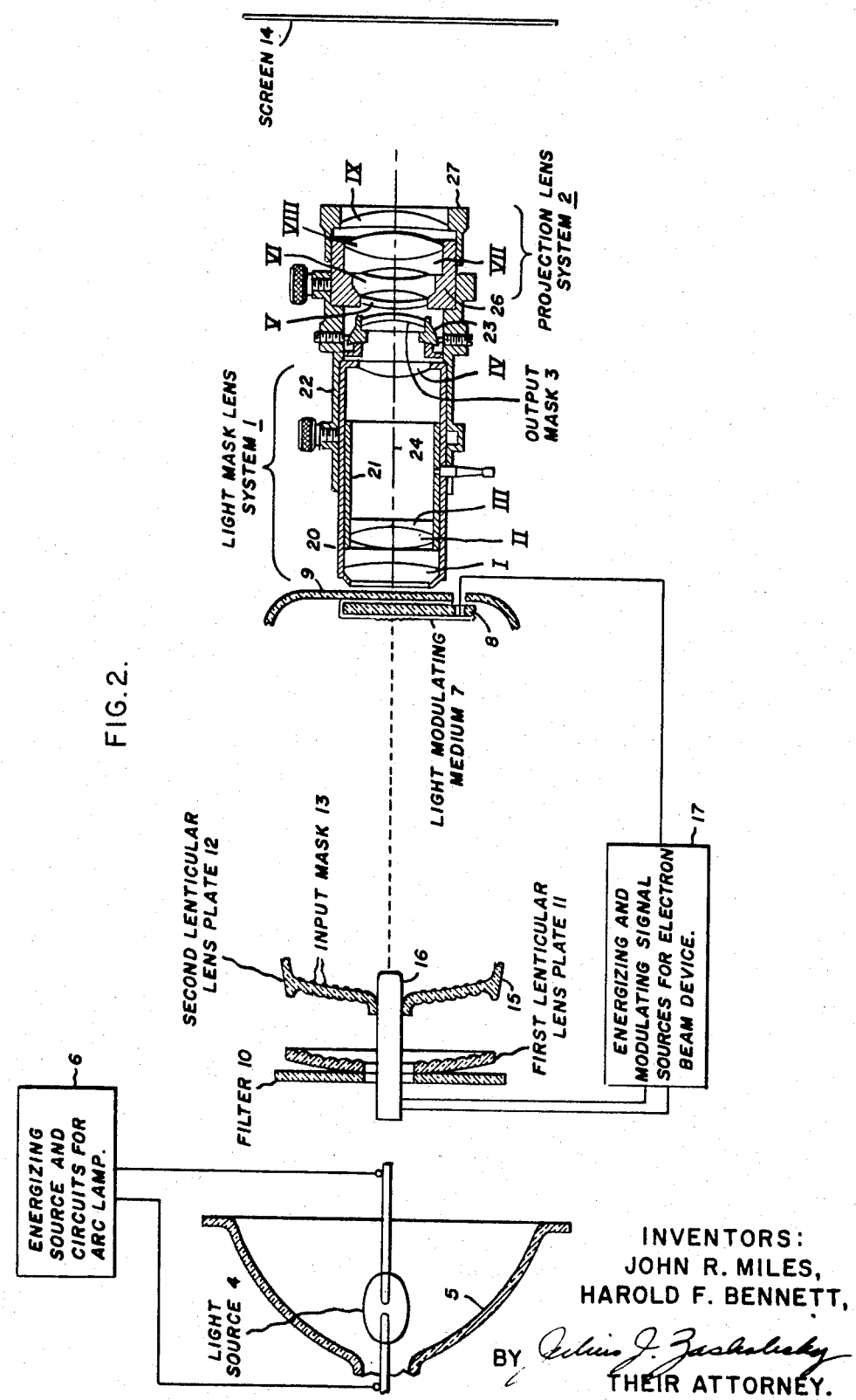

3,328,111
DUAL PURPOSE LENS SYSTEM FOR LIGHT PROJECTION APPARATUS
Harold F. Bennett, Evanston, and John R. Miles, Glenview, Ill., assignors to General Electric Company, a corporation of New York
Filed Jan. 8, 1964, Ser. No. 336,505
2 Claims. (Cl. 350—214)

ABSTRACT OF THE DISCLOSURE

The lens system projects an image on a flat surface adjacent the rear of the system on a distant screen and also projects an image of a curved surface behind the flat surface onto another curved surface within the system. Nine lens elements perform the former function and four of the nine lens elements preceding the other curved surface perform the latter function.

---

The lens system projects an image on a flat surface adjacent the rear of the system on a distant screen and also projects an image of a curved surface behind the flat surface onto another curved surface within the system. Nine lens elements perform the former function and four of the nine lens elements preceding the other curved surface perform the latter function.

The present invention relates to lens systems for image projection apparatus.

One form of such apparatus comprises a pair of light masks including similar arrays of transparent and opaque portions, a light modulating medium located between the light masks and adapted to be deformed into light diffraction gratings by electron charges deposited thereon in response to electrical signals corresponding to an image to be projected, and a source of light. Such apparatus usually includes the following optical systems:

(1) A first optical system for directing light from the light source through the transparent portions of the one of said masks adjacent thereto onto the light modulating medium.

(2) A second optical system for imaging the light passed by the transparent portions of said one mask onto corresponding opaque portions of the other of said masks, and (3) A third optical system for projecting an image of the light modulating medium onto a screen.

The elements of the first optical system are usually situated between the light source and the light input mask. The elements of the second optical system may be located either on the light input or light output side of the light modulating medium between the light input and the light output masks. The elements of the third optical system are located between the light modulating medium and the screen. In the absence of deformations in the modulating medium, light from the source is blocked by the output mask, and does not reach the screen. When the surface of the modulating medium is deformed by the deposition of electron charges thereon in response to electrical signals corresponding to an image to be projected, light incident on the medium is refracted and diffracted and passes through the transparent portions in the output mask onto the screen and forms an image thereon corresponding to the electrical signals.

An important requirement of the second optical system is that it image the transparent portions of the input mask on corresponding opaque portions of the output mask with a high degree of registration in the absence of deformations in the medium. An important requirement of the third optical system is that it project with good resolution a portion of the light diffracting and refracting medium of relatively small dimensions on a relatively large screen positioned at a substantial distance from the system.

Accordingly, it is an object of the present invention to provide a dual purpose optical system which projects an image formed on a flat surface immediately adjacent the rear of the system through the front of the system onto a screen at a substantial distance from the system and also projects an image of a curved or flat surface at a moderate distance behind the system onto a curved or flat surface within the system.

Another object of the present invention is to provide a dual purpose optical system of high performance requiring a minimum number of easily formed components.

Another object of the present invention is to provide a dual purpose, high performance optical or lens system of the character indicated including a unitary assemblage of components of minimal axial and radial extent.

In carrying out the invention in one illustrative form thereof there is provided two groups of lens elements, a first group functioning to image a first object surface on a first image surface with minimal aberration and the second group following the first image surface and functioning to diverge light from the first group of lens elements and complete the correction for aberrations in the entire system. These functions are achieved by including in each of the groups a cemented doublet of a double convex and a double concave element. These doublets are so constituted, oriented, and spaced in their respective groups to achieve in cooperation with the other elements in the system the functions enumerated. In addition the elements are appropriately shaped, constituted, oriented and spaced to produce excellent imaging and resolution of the objects with minimal spurious image renditions resulting from light reflections and interactions in the system.

The novel features believed characteristic of the invention are set forth in the appended claims. The invention itself, together with further objects and advantages thereof may best be understood by reference to the following description taken in connection with the accompanying drawings in which:

FIGURE 1 is a side view in section of the lens assembly, and

FIGURE 2 is a schematic view showing the lens assembly used in a light valve projection apparatus of the character described.

Referring now to FIGURE 1 there is shown a lens assembly including a first group 1 and second group 2 of lens elements. The first group 1 functions to image with minimal aberration an object surface (not shown) at a moderate distance behind the assembly onto an image surface shown as a spherical light mask 3 lying within the system. The second group 2 in conjunction with first group 1 functions to project with minimal aberration an image lying in another object surface (not shown) immediately behind the rear of the assembly onto a screen (not shown) lying at a substantial distance in front of the assembly. The first object surface is convex as viewed from the rear of the apparatus of which it is a part and the first image surface is concave as so viewed. The surface area of the first object surface is greater than the surface area of the first image surface. The second object surface is planar and larger than the surface area of the first image surface area. The second image surface area is curved or planar and substantially larger than the surface area of the second object surface.

The first group 1 consists of four lens elements, designated I, II, III, and IV starting from the rear of the system. Lens element I is essentially double convex.

Lens element I functions in the main to collect the rays from the first object surface at a moderate distance behind the assembly to more nearly focus them on the first image surface 3 of the system. Lens element II is double convex. Lens element II also serves the purpose of converging the rays from the first object surface onto the image surface 3. Lens element III is plano-concave. Lens element III functions primarily to correct chromatic aberrations although it also functions to correct spherical aberrations. Lens element IV is convex-plano. Lens element IV is substantially separated from the first three lens elements of the system and functions substantially to correct coma and spherical aberrations and also converges light rays falling thereon. Lens elements II and III form a doublet.

The second group 2 of lens elements consists of five lens elements, designated V, VI, VII, VIII and IX starting from the rear end of the system, each aligned on a common axis with the elements of the first group. Lens element V is a meniscus lens. Lens element V functions to decrease the curvature of field and astigmatism of the lens system as it has substantial thickness in relation to the curvature of the two surfaces thereof. By proper choice of curvature and thickness astigmatism and spherical aberrations are considerably reduced so as to improve the image formed on the screen. Lens element VI is double concave. Lens element VI functions to correct for astigmatism, curvature of field, spherical aberrations, chromatic aberrations and other high order aberrations in the system. Lens element VII is double concave. Lens element VIII is double convex. Elements VII and VIII are cemented together and function to correct coma, spherical aberrations, field curvature, astigmatism and other aberrations. Lens element IX is a positive meniscus lens. Lens element IX adds substantially to the positive power of the system. This element is used for focusing the lens system for different projection distances to the screen. The lens elements of the second group are of moderately lesser total axial extent than the lens elements of the first group.

In Table I construction data are set forth on a typical example in accordance with the present invention:

TABLE I

| Lens | Radii | Thickness | Space | Index of Refraction $N_d$ | Reciprocal Dispersion Ratio $\nu$ |
|------|-------|-----------|-------|---------------------------|-----------------------------------|
| I    | $R_1=+668.45$ $R_2=-119.0$ | $t_1=8$ | | 1.71288 | 53.89 |
|      |       |           | $S_1=7$ |       |       |
| II   | $R_3=+75.59$ $R_4=-48.1$ | $t_2=10$ | | 1.69069 | 55.61 |
|      |       |           | $S_2=0$ |       |       |
| III  | $R_5=-48.1$ $R_6=\infty$ | $t_3=2$ | | 1.76157 | 26.52 |
|      |       |           | $S_3=65$ |       |       |
| IV   | $R_7=+39.2$ $R_8=\infty$ | $t_4=5$ | | 1.71288 | 53.89 |
|      |       |           | $S_4=18.8$ [1] |       |       |
| V    | $R_9=+125.8$ $R_{10}=+96.3$ | $t_5=6.5$ | | 1.620 | 36.3 |
|      |       |           | $S_5=4$ |       |       |
| VI   | $R_{11}=-22.66$ $R_{12}=+55.0$ | $t_6=2$ | | 1.54753 | 42.39 |
|      |       |           | $S_6=3.62$ |       |       |
| VII  | $R_{13}=-107.82$ $R_{14}=+39.0$ | $t_7=3$ | | 1.62572 | 35.64 |
|      |       |           | $S_7=0$ |       |       |
| VIII | $R_{15}=+39.0$ $R_{16}=-75.981$ | $t_8=11.54$ | | 1.71288 | 53.89 |
|      |       |           | $S_8=2$ [2] |       |       |
| IX   | $R_{17}=-290.5$ $R_{18}=-51.13$ | $t_9=5.5$ | | 1.71684 | 47.9 |

[1] For metallic mask.
[2] Variable from .8 to 8.00.

Total length of assembly from lens I to lens VIII = 152.86 mm. (without including variable $S_8$). Relative aperture of lens system I–IV = $f/2.0+$. Relative aperture of lens system I–IX = $f/3.0$. Radii, thickness, and spacing are in millimeters. Centers of curvature to the right of the lens elements are positive and centers of curvature to the left are negative.

The radii of each of the refractive surfaces are $R_1$ through $R_{18}$, the thickness of each of the lens elements $t_1$ through $t_9$, the air space between each adjacent elements $S_1$ through $S_8$, the refractive index for sodium light $N_d$ and the reciprocal dispersion ratio $\nu$ are set forth for each of the lens elements I through IX. The spacing $S_8$ is variable from .8 millimeter to 8.00 millimeters depending on the location of the screen or second image surface at approximately 32 feet or 3 feet, respectively.

Considerable variations can be made in lens thickness and spacing between the lenses provided corresponding variations are made in the system without departing from the essence of the present invention. The index of refraction and reciprocal dispersion ratio of the lens material can also be varied provided proper compensations are made which can be found by anyone skilled in the art once the original general arrangement of the system is known. The system in accordance with the present invention involving the projection of a pair of objects has been substantially corrected for the spherical aberrations, chromatic aberration, field curvature, astigmatism, and for coma, distortion, and lateral color.

The light mask 3 may be in the form of a convex-concave optical element having closely spaced concentric surfaces on one of which suitable opaque portions are formed, or a thin metallic member in which suitable transparent portions have been formed. When so formed the mask would not contribute significantly to the aberrations of the system. In the alternative the mask may be an opaque member into which transparent portions have been formed. In the example the axial spacing of the adjacent surfaces of element IV and the mask is 17.3 mm.

Referring now to FIGURE 2 there is shown a schematic diagram of an embodiment of the present invention in image projection apparatus. The lens elements of FIGURE 2 have numerical designations corresponding to the numerical designations of the lens elements in FIGURE 1. The apparatus comprises a source 4 of light which may include a pair of arc electrodes located substantially at one focus of an elliptical reflector 5 and energized from source 6, at the other focus of which a suitable light modulating medium 7 is situated. The latter may be a suitable film of oil which is continuously introduced on a moveable conductive transparent plate (Detail means for supplying and moving such a medium is not shown.) The transparent plate member 8 and the window member 9 may be planar elements and have inappreciable effect on the imaging function of the lens system 1 and 2. These members and the transparent light modulating medium have comparable indices of refraction. In between the light source 5 and the modulating medium 7 are situated a color filter 10 to selectively pass the appropriate color components of light through various parts of the system, a first and a second lenticular plate 11 and 12, and input light mask 13 which is formed on the surface of member 12 adjacent to the light modulating medium. Each of the lenticular plates 11 and 12 are sectors of the hollow spheres or shells. The light input mask 13 including similar arrays of transparent and opaque oblong portions, referred to respectively as slots and bars is situated on the surface of the lens plate 12 adjacent the light modulating medium. The first lenticular plate 11 has on its inner surface a series of lenticules or small spherical lenses which function to focus the light from the source onto the openings of the input light mask 13. The second lenticular plate 12 has on its outer surface a series of lenticules each of which function to image a respective lenticule on the first plate onto an active area of the light modulating medium which may be of the order one inch wide and three-fourths of an inch high in the embodiment under consideration. The light output mask 3 includes arrays of transparent opaque portions similar to the arrays of the input mask.

In the absence of any deformation in the surface of the medium 7, the transparent portions of the input mask are imaged by the first group 1 of lens of the lens system onto corresponding opaque portions on the light output mask 3. When the surface of the modulating medium is deformed by the deposition of an electron charge pattern thereon in response to electrical signals corresponding to an image to be projected light incident on the medium is diffracted and refracted and passes through the transparent portions in the output mask 3. Such light is then projected by the second group 2 of lenses onto a distant screen 14. The light modulating medium 7 is contained in an enclosure 15 which also includes an electron beam device 16 responsive to a signal source for modulating the light modulating medium. Further details on the apparatus shown in FIGURE 2 is included in U.S. Patent 3,272,917 and patent application Ser. No. 316,606, filed Oct. 16, 1963 assigned to the assignee of the present invention.

The lens elements of FIGURE 1 are assembled on a plurality of concentric and axially aligned cylindrical members. Lens elements I and IV are secured at opposite ends of a cylindrical tubular member 20. Within this tubular member the doublet consisting of lenses II and III are secured to another cylindrical member 21 moveable axially within the cylindrical member 20 permitting proper imaging of the first object surface i.e., the input mask 13, on the image surface of output mask 3. Output mask member 3 is mechanically mounted on an assembly 23 within cylindrical assembly 22 which is coaxial with cylinder 20 and axially moveable thereover. The assemblies 22 and 23 permit movement of the assembly 23 along any great circle of a sphere as well as about and along the axis 24 of the lens system. Lens elements V, VI, VII and VIII are fixed to the tubular member 26 coaxial with respect to the tubular members 20 and 21. Lens element IX is mounted on a cylindrical member 27 which is axially moveable with respect to lens elements V, VI, VII and VIII. The input mask 13 is properly imaged on the output mask member 3 by the adjustment of tubular member 21 and mask assembly member 23. Proper imaging of the active area of the light modulating medium 7 on the screen 14 is achieved by proper axial adjustment of the lens assembly IX.

Thus in accordance with the present invention there is provided a dual purpose optical system of high performance having a minimum number of lens elements. Each of the objects are projected on their respective surfaces with faithful rendition. The lenses are appropriately spaced in the two groups of lens elements so that a relatively large portion of the axial length of the first group is air space. Such provision minimizes the adverse effects of reflections and other interactions at the various optical surfaces from affecting the fidelity of projection. The axial length of the system is kept to a minimum. The radial extent of the system is kept to minimum proportions without sacrificing uniformity of projection over the image surfaces thereof.

While the invention has been described in specific embodiments it will be appreciated that many modifications may be made by those skilled in the art, and we intend by the appended claims to cover all such modifications and changes as fall within the true spirit and scope of the invention.

What we claim as new and desire to secure by Letters Patent of the United States is:

1. A lens assembly for the imaging of a first object surface of one curvature at a moderate distance behind the assembly onto a first image surface of opposite curvature within the assembly and for the projection of a second plane object surface adjacent the rear of the assembly onto a second plane image surface at a substantial distance in front of the assembly comprising nine elements having the following construction and data:

| Lens | Radii | Thickness | Space | Index of Refraction $N_d$ | Reciprocal Dispersion Ratio $\nu$ |
|---|---|---|---|---|---|
| I | $R_1=+668.45$ | $t_1=8$ | | 1.71288 | 53.89 |
| | $R_2=-119.0$ | | $S_1=7$ | | |
| II | $R_3=+75.59$ | $t_2=10$ | | 1.69669 | 55.61 |
| | $R_4=-48.1$ | | $S_2=0$ | | |
| III | $R_5=-48.1$ | $t_3=2$ | | 1.76157 | 26.52 |
| | $R_6=\infty$ | | $S_3=65$ | | |
| IV | $R_7=+39.2$ | $t_4=5$ | | 1.71288 | 53.89 |
| | $R_8=\infty$ | | $S_4=18.8$ [1] | | |
| V | $R_9=+125.8$ | $t_5=6.5$ | | 1.620 | 36.3 |
| | $R_{10}=+96.3$ | | $S_5=4$ | | |
| VI | $R_{11}=-22.66$ | $t_6=2$ | | 1.54753 | 42.39 |
| | $R_{12}=+55.0$ | | $S_6=3.62$ | | |
| VII | $R_{13}=-107.82$ | $t_7=3$ | | 1.62572 | 35.64 |
| | $R_{14}=+39.0$ | | $S_7=0$ | | |
| VIII | $R_{15}=+39.0$ | $t_8=11.54$ | | 1.71288 | 53.89 |
| | $R_{16}=-75.981$ | | $S_8=$ [2] | | |
| IX | $R_{17}=-290.5$ | $t_9=5.5$ | | 1.71684 | 47.9 |
| | $R_{18}=-51.13$ | | | | |

[1] For metallic mask.
[2] Variable from .8 to 8.00.

wherein $N_d$ and $\nu$ are the index of refraction for sodium light and the reciprocal dispersion ratio, respectively, said first image surface being positioned between said fourth and fifth elements.

2. A lens assembly for the imaging of a first object surface one curvature at a moderate distance behind the assembly onto a first image surface of opposite curvature within the assembly comprising four elements having the following constructional data:

| Lens | Radii | Thickness | Space | Index of Refraction, $N_d$ | Reciprocal Dispersion Ratio $\nu$ |
|---|---|---|---|---|---|
| I | $R_1=-668.45$ | $t_1=8$ | | 1.71288 | 53.89 |
| | $R_2=+119.0$ | | $S_1=7$ | | |
| II | $R_3=-75.59$ | $t_2=10$ | | 1.69669 | 55.61 |
| | $R_4=+48.1$ | | $S_2=0$ | | |
| III | $R_5=48.1$ | $t_3=2$ | | 1.76157 | 26.52 |
| | $R_6=\infty$ | | $S_3=65$ | | |
| IV | $R_7=-39.2$ | $t_4=5$ | | 1.71288 | 53.89 |
| | $R_8=\infty$ | | | | | wherein $N_d$ and $\nu$ are the index of refraction for sodium light and the reciprocal dispersion ratio, respectively.

References Cited

UNITED STATES PATENTS 1,863,099  6/1932  Bowen _____ 88—57 X
2,985,866  5/1961  Norton _____ 88—61 X JEWELL H. PEDERSEN, *Primary Examiner.*

JOHN K. CORBIN, *Examiner.*